United States Patent [19]

Lee et al.

[11] Patent Number: 5,378,201

[45] Date of Patent: Jan. 3, 1995

[54] MULTI-GEARED BICYCLE TRANSMISSION ASSEMBLY COMPRISING INTERNAL GEAR SETS

[76] Inventors: Myunwoo Lee, 103-220, Sungsan-dong, Mapo-ku, Seoul, 121-250; Wooil Lee, 14-1008, Chungsil Apt., Daechee-dong, Kangnam-ku, Seoul; Minsu Kim, 91 Bungee, 1 ka Sinhung-dong, Jung-ku, Incheon, 400-101, all of Rep. of Korea

[21] Appl. No.: 41,600

[22] Filed: Apr. 5, 1993

[30] Foreign Application Priority Data

Apr. 4, 1992 [KR] Rep. of Korea ............. 92-24870

[51] Int. Cl.$^6$ ................. F16H 9/00; F16H 61/00
[52] U.S. Cl. .................... 474/77; 475/302; 475/343
[58] Field of Search ........... 474/72, 77, 78, 80–82; 475/302, 343

[56] References Cited

U.S. PATENT DOCUMENTS

| | | | |
|---|---|---|---|
| 3,513,725 | 5/1970 | Shimano et al. | 475/302 X |
| 4,181,043 | 1/1980 | Waddington | 475/16 |
| 4,260,386 | 4/1981 | Frohardt | 474/72 |
| 4,281,845 | 8/1981 | Brown | 474/72 X |
| 4,283,069 | 8/1981 | Citelli | 474/72 X |
| 4,400,999 | 8/1983 | Steuer | 475/302 X |
| 4,706,982 | 11/1987 | Hartmann | 475/277 X |
| 4,712,450 | 12/1987 | Takamiya et al. | 475/343 X |
| 4,782,722 | 11/1988 | Powell | 475/213 |
| 4,854,191 | 8/1989 | Nagano | 475/289 |
| 5,292,286 | 3/1994 | Lan | 474/78 X |

Primary Examiner—Roger J. Schoeppel
Attorney, Agent, or Firm—Cushman, Darby & Cushman

[57] ABSTRACT

A transmission assembly for a bicycle which is able to achieve variations in rotational force and velocity through internal gearing mechanisms which require no variation in sprocket diameter. The transmission assembly includes a front and rear transmission means, and a chain which connects them. Each transmission means includes one or more sprockets and gear sets with which the chain connects. Each gear set then includes a sun gear, a plurality of planetary pinions which rotate and revolve around the sun gear, a ring gear encasing the planetary pinions, and a carrier to which the planetary pinions are attached. This assembly helps prevent the chain from derailling, quickens the shifting process, and simplifies the structure and construction of transmission assemblies for bicycles.

5 Claims, 8 Drawing Sheets

MULTI-GEARED BICYCLE TRANSMISSION ASSEMBLY COMPRISING INTERNAL GEAR SETS

BACKGROUND OF THE INVENTION

1. Field of the Invention

The present invention relates to transmission assemblies for bicycles, and especially to multi-geared transmission assemblies which provide selectable velocity ratios.

2. Description of the Related Art

Bicycles are lightweight, two-wheeled, steerable machines which have been used for transportation, racing, and touring throughout the world over the past two centuries.

Bicycles are propelled by a rider who applies a force to the bicycle transmission assembly using a crank. The transmission assembly is then used to transmit the force to the rear wheel where it is used to drive the bicycle.

Therefore, efficient transmission assemblies which are capable of improving the bicycle speed for a given pedalling rate are essential. For this reason, two types of transmission assemblies have been developed: the epicyclic, which alters the speed of the driver sprocket relative to the rim of the wheel, and the derailleur, which requires movement of the chain from sprocket to sprocket.

Epicyclic gears are made in two-, three-, four-, and five-speed models incorporated in the rear hub. They are controlled by levers or twist-grip mechanisms, utilizing cables mounted on the handlebars or on the frame tubes. Two-speed hub gears are most often made in brake-hub form, controlled by a rotating sprocket in the reverse direction.

The conventional derailleur gears consist of a mechanism to move the chain from one sprocket wheel to another of different size. By varying the size of the driving sprockets, the rear wheel can be made to pass through more or fewer revolutions for each turn of the crank. Cyclists can use up to six sprocket wheels on the rear freewheel and three on the crank. The mechanism is spring loaded to absorb chain slack and is controlled by a cable from the frame or handlebars.

Figure 8:
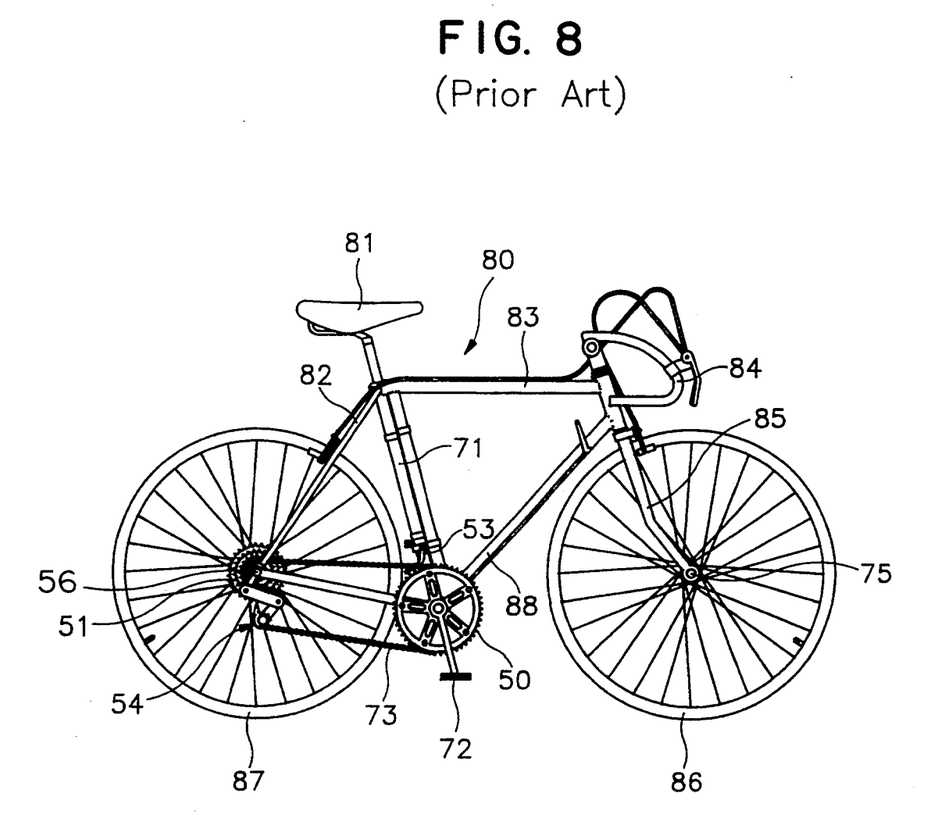
FIG. 8 is a side view of a vehicle having a conventional multi-stage transmission.

As shown in FIG. 8, the above-described conventional bicycle includes the following parts: a transmission assembly, front and rear wheels 86 and 87, pedal 72, seat 81, handle 84, and frame 80 which includes rear wheel tip 74, seat stay 82, seat tube 71, fork 85, fork tip 75, down tube 88, and an optional crossbar 83.

A bicycle transmission assembly which incorporates the derailleur mechanism includes front and rear sprocket assemblies 50 and 51 rotatably coupled to frame 80 for receiving chain 73. The transmission assembly also includes front and rear derailleur assemblies 53 and 54 for enabling chain 73 to be shifted from one sprocket to another. Chain 73 is then included in the transmission assembly for transferring force from the front sprocket assembly 50 to the rear sprocket assembly 51.

Figure 6:
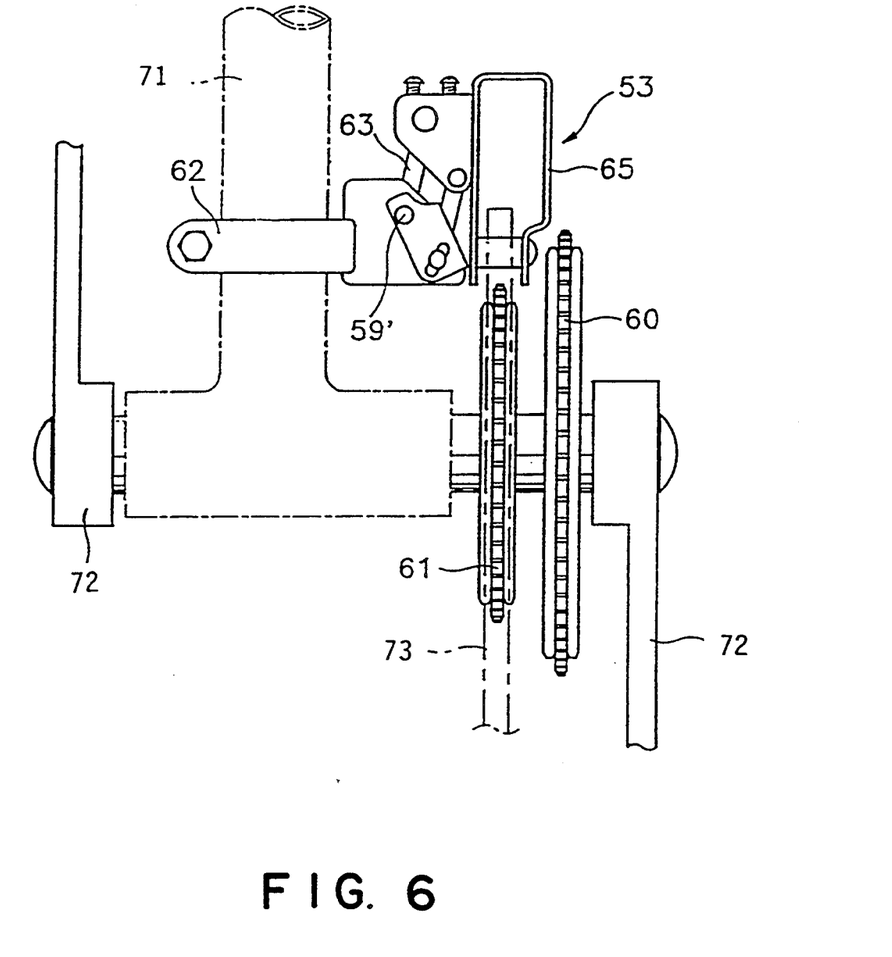
FIG. 6 is a partly enlarged view of the front transmission means of the transmission assembly in accordance with the present invention.

The front sprocket assembly frequently incorporates a two-stage sprocket to provide both high gear 60 and low gear 61 as shown in FIG. 6. Assembly 50 is mounted between the lower portion of seat tube 71 and the base of pedal 72, being rotated about fixed shaft 56.

A front derailleur is also provided for shifting between the sprockets. Derailleur 53 is connected to seat tube 71 by connecting band 62. It includes chain guide 65 which supports chain 73 at the level of the highest sprocket 60. Link means is used to pivot derailleur 53 about hinge 59', thereby moving chain guide 65 laterally over high and low speed sprockets 61 and 60.

When chain guide 65 is shifted, chain 73 is forced toward the adjacent or receiving sprocket until a cog of the adjacent sprocket catches it. Chain 73 is then completely transferred to the receiving sprocket after one full rotation at which time the shift is completed.

Figure 7:
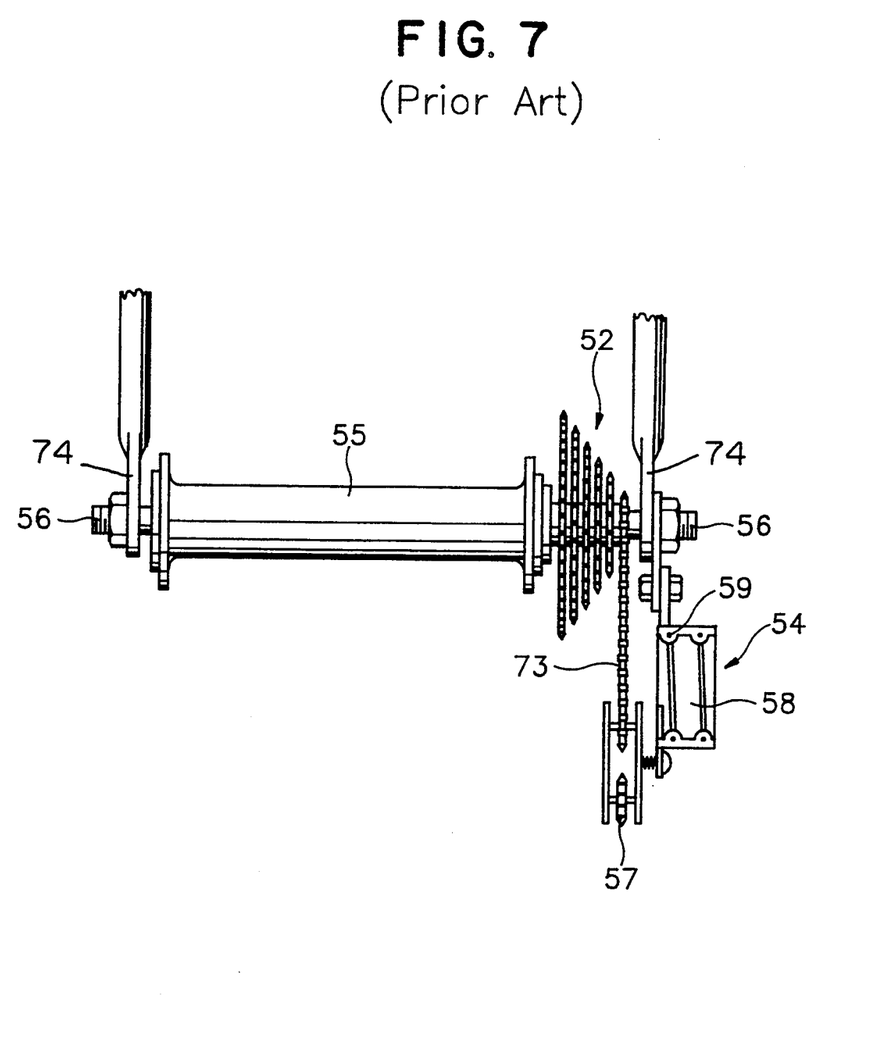
FIG. 7 is a partly enlarged view of the rear transmission means of the transmission assembly in accordances,with the present invention.

The rear transmission means is similar in style to the front transmission means described above since both incorporate multi-stage sprocket assemblies. However, multi-stage rear sprocket assembly 51 often incorporates up to six stages in its multi-stage sprocket as shown in FIG. 7.

The rear transmission means includes multi-stage rear sprocket 52 which is mounted between hub 55 and rear tip 74, where it rotates about fixed shaft 56. It also includes rear derailleur assembly 54 which is mounted below and outside rear tip 74. Finally, chain 73 connects guide gear 57 to multi-stage rear sprocket 52.

A cable (not shown) is then used to apply or release pressure on rear derailleur 54 causing it to pivot around hinge 59 thereby realigning chain 73 with a different sprocket. Chain 73 is then shifted and transferred to the receiving sprocket after one full rotation has been completed.

Multi-stage sprockets of varying diameters provide a means of improving the bicycle speed for a given pedalling rate. However, using them requires the chain to be a distance from the hub greater than the largest sprocket perimeter. Consequently, there is a large distance between the chain and the smaller sprockets. This results in decreased control and frequent chain derailling.

Multi-stage sprockets of varying diameters are also deficient in terms of manufacturing due to their complexity.

SUMMARY OF THE INVENTION

The purpose of the present invention is to simplify the structure of the conventional multi-sprocket bicycle transmission while increasing control during each shift.

By providing a multi-geared bicycle transmission assembly comprising internal gear sets, sprockets of varying diameter are not necessary to achieve varying gear ratios. Because the sprockets in this transmission assembly may be of equal diameter, the chain is positioned closer to all sprockets thereby increasing transmission control. Manufacturing is also simplified when using sprockets of equal diameter causing production costs to decrease.

A bicycle transmission assembly in accordance with the present invention includes a front transmission means, a rear transmission means and a chain.

The front transmission means within the assembly includes one or more planetary gear sets, a sprocket positioned aside the planetary gear sets, a front sprocket selector positioned above both the planetary gear sets and the sprocket, and a flange formed at a side of the seat tube.

Each planetary gear set within the front transmission means includes a sprocket, a plurality of planetary pinions, a carrier, a sun gear, and a ring gear. They provide a means of decreasing the driving force, thereby increasing the rotational velocity of the sprocket attached to them.

Therefore, it is not necessary to change the sprocket size to change the number of revolutions made by the rear wheel for each turn of the crank.

DETAILED DESCRIPTION OF PREFERRED EMBODIMENTS

A preferred embodiment of a bicycle transmission assembly in accordance with the present invention is described referring to FIGS. 1, 2, 3, 4, and 5.

Figure 5:
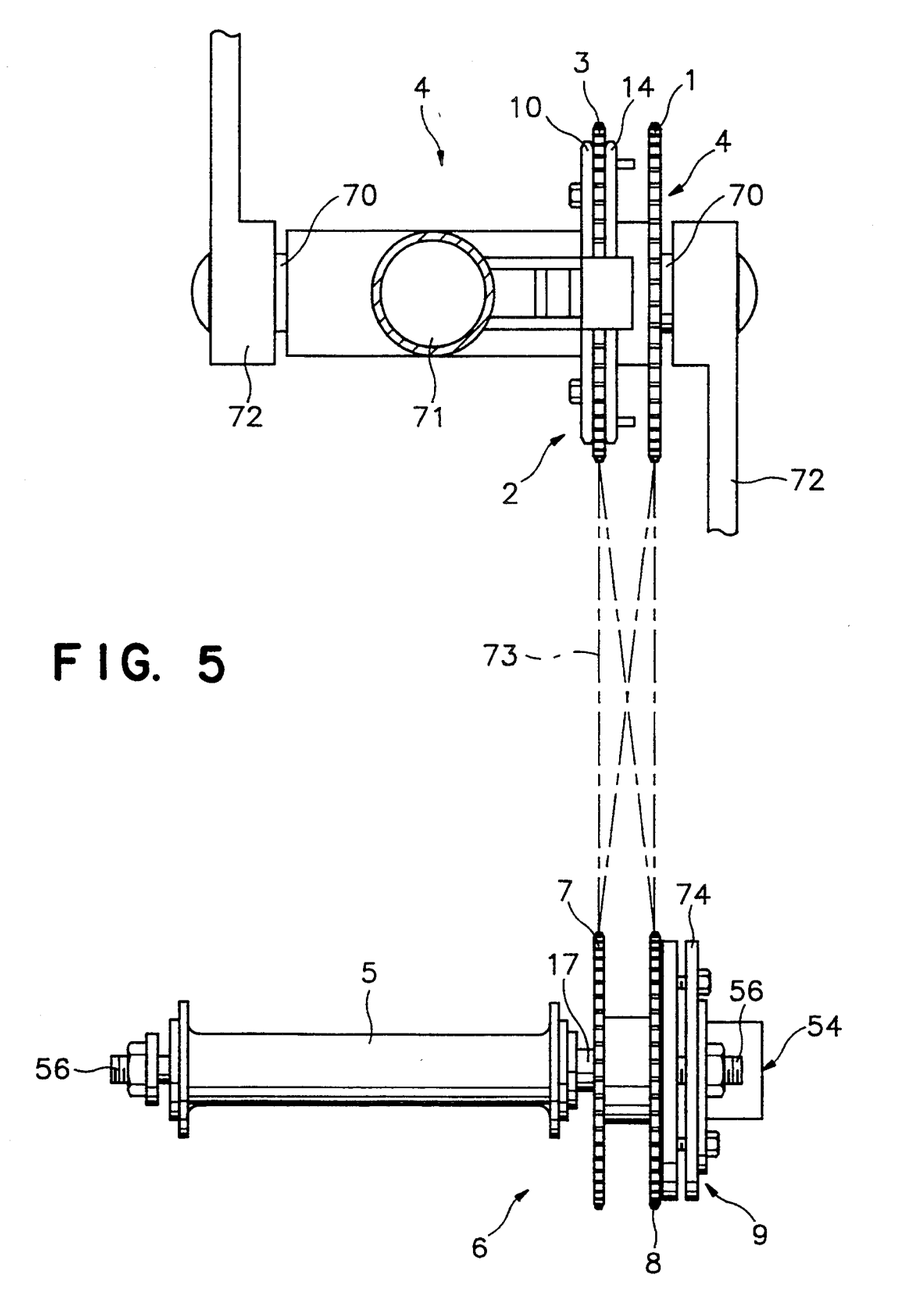
FIG. 5 is a schematic view showing a connecting state of the front and rear transmission means shown in FIG. 3 and FIG. 4.

FIG. 5 shows a schematic view of the bicycle transmission assembly which includes front transmission means 4, rear transmission means 6, and chain 73 linking the two transmission means, chain 73 being entrained around a sprocket from each of them.

Front transmission means 4 is rotatably coupled to seat tube 71, with both crank shaft 70 and pedal 72 attached to it. Similarly, rear transmission means 6 is rotatably coupled to fixed shaft 56 at hub 5 of rear tip 74.

Internal gear sets 2 and 9 may be incorporated into the front and rear part of the transmission assembly, respectively. Each gear set is provided as a means for modification of both the rotational force and the rotational velocity within its assembly. Therefore, the sprockets of internal gear sets 2 and 9 are able to rotate faster or slower than the hub about which they are centered.

Figure 1:
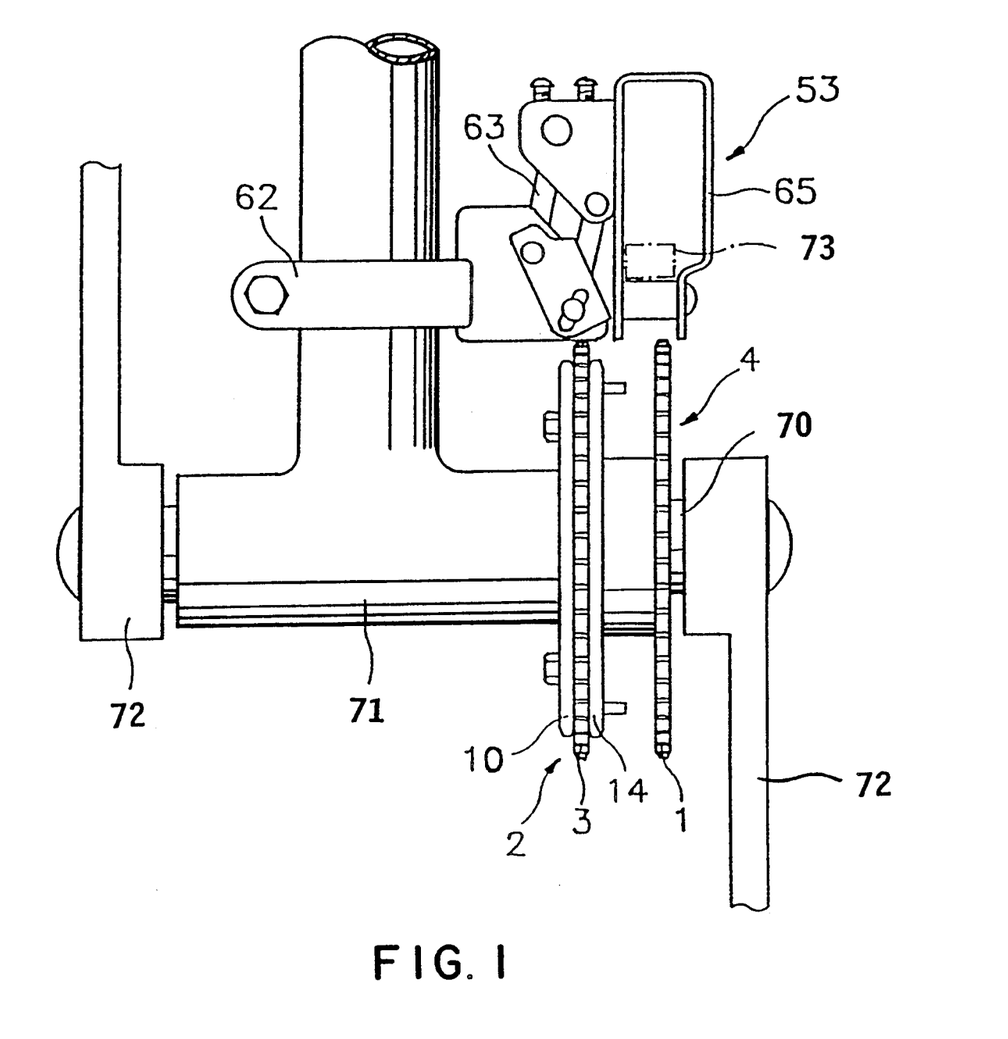
FIG. 1 is a partly enlarged view of the front transmission means of a transmission assembly in accordance with the present invention.

FIG. 1 shows an enlarged view of front transmission means 4 which includes flange 10 mounted on the base of seat tube 71, and first sprocket 1 mounted on crank shaft 70, being insertable into seat tube 71. Further included are front sprocket selector 53 mounted on the neck of seat tube 71, and pedal 72 mounted on the end of crank shaft 70. Front transmission means 4 also includes front planetary gear set 2 mounted on crank shaft 70, between flange 10 and first sprocket 1.

Figure 3:
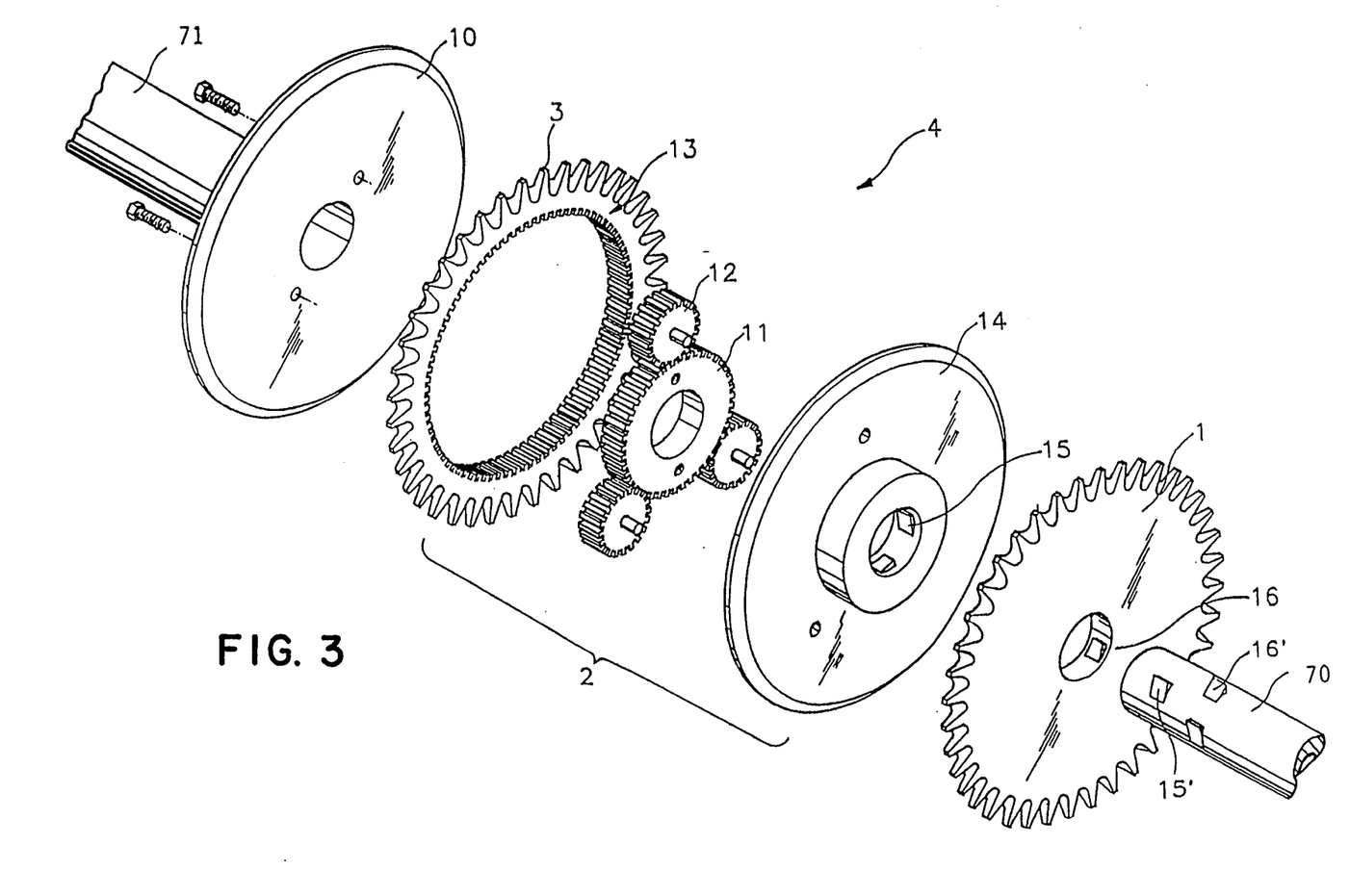
FIG. 3 is an exploded view of the front transmission means shown in FIG. 1.

FIG. 3 shows an exploded view of said front planetary gear set 2. It includes first sun gear 11 fixed on flange 10. Front planetary gear set 2 also includes first planetary pinions 12 arranged on the perimeter of sun gear 11. These first planetary pinions are adjacent to front carrier 14 and encased by first ring gear 13. A second sprocket 3 is then formed on the perimeter of first ring gear 14.

First sprocket 1 of the front transmission means is constructed with teeth along the perimeter of a solid wheel. Any rotational force applied to crank shaft 70 will therefore be maintained as it is transmitted to the perimeter of the sprocket for driving chain 73.

Although second sprocket 3 may be similar in diameter to first sprocket 1, the driving force applied to it from crank shaft 70 is effectively decreased by the revolution and rotation of first planetary pinions 12. This results in an increases in rotational velocity for both first ring gear 13 and second sprocket 3. Therefore, second sprocket 3 rotates faster than the crank shaft driving it.

Because second sprocket 3 modifies both rotational velocity and force, and first sprocket 1 transmits rotational velocity and force applied to it without modification, the rotational force and rotational velocity vary between first and second sprockets 7 and 8.

First sprocket 1 and front carrier 14 are further comprised of ratchet means 16 and 15 located on their inner boundary. Projection means 15' and 16' are then coupled to crank shaft 70 where first sprocket 1 and front carrier 14 mount.

Ratchet means 15 and 16 then brace against projection means 15' and 16' when the sprockets are rotating in the forward direction, thereby allowing for forward driving capability. Alternatively, the ratchet means slide freely over the projection means when the sprockets are rotating in the reverse direction, thereby maintaining rotational mobility in the reverse direction.

Therefore, the ratchet means are used to maintain the rotational mobility in both the forward and reverse direction, while restricting the driving capability to the forward direction.

Second sprocket 3 is indirectly driven by front carrier 14 which uses said ratchet means 15 to couple with crank shaft 70. Consequently, second sprocket 3 maintains its rotational mobility while being restricted to a forward driving capability.

Another component in front transmission means 4 is front sprocket selector 53 which is joined to seat tube 71 using link means 63 and coupling band 62. Sprocket selector 53 includes chain guide 65 which supports chain 73 at a constant height. Because the sprockets may be of equal diameter, chain 73 is able to maintain close proximity with all sprockets. Consequently, the chain experiences no vertical movement in the front transmission means which results in a faster, more efficient shift as follows.

Chain guide 65 is shifted laterally when sprocket selector 53 is adjusted for a new sprocket. Chain 73 is thereby forced laterally toward the adjacent or receiving sprocket until a cog of this adjacent sprocket catches it. The chain is then completely transferred to the receiving sprocket after one full rotation has been completed.

Figure 2:
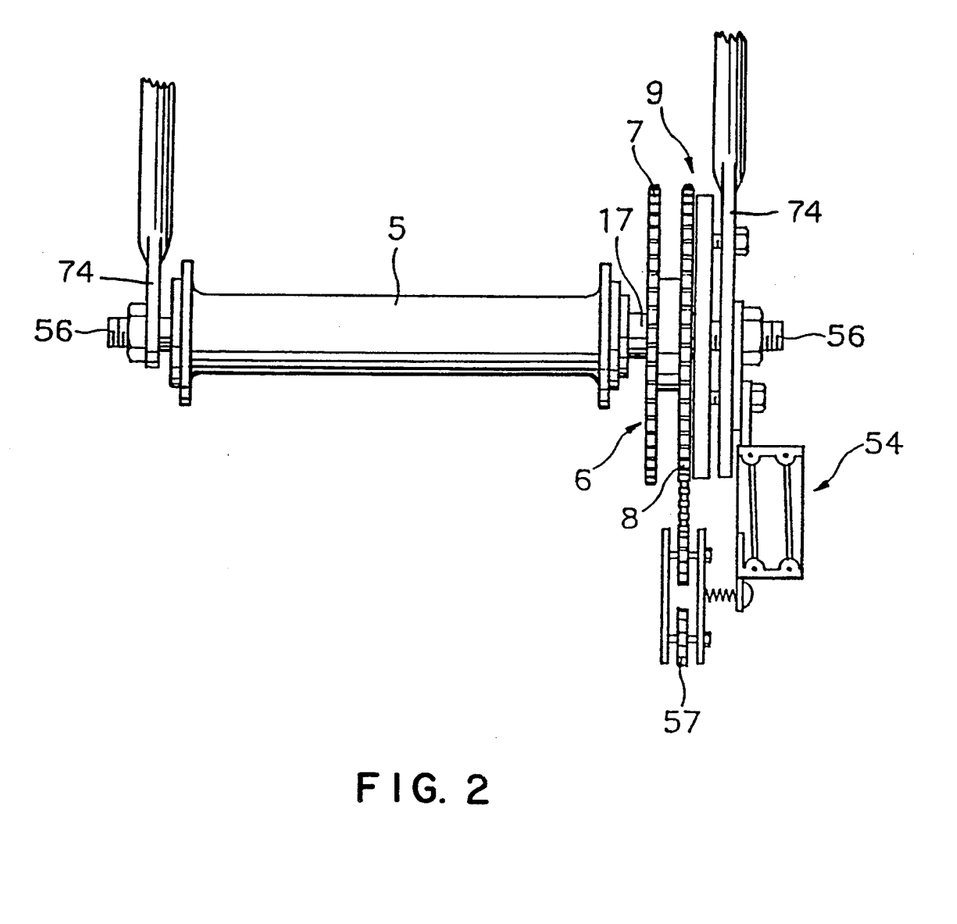
FIG. 2 is a partly enlarged view of the rear transmission means of a transmission assembly in accordance with the present invention.

FIG. 2 is an enlarged view of rear transmission means 6 including hub extension 17 of rear hub 5, and third sprocket 7 mounted on the hub extension and inside the rear tip 74. Rear planetary gear set 9 is also mounted on the hub extension between third sprocket 7 and rear tip 74. Rear sprocket selector 54 is then attached to the lower, outside portion of rear tip 74 from which it hangs.

Figure 4:
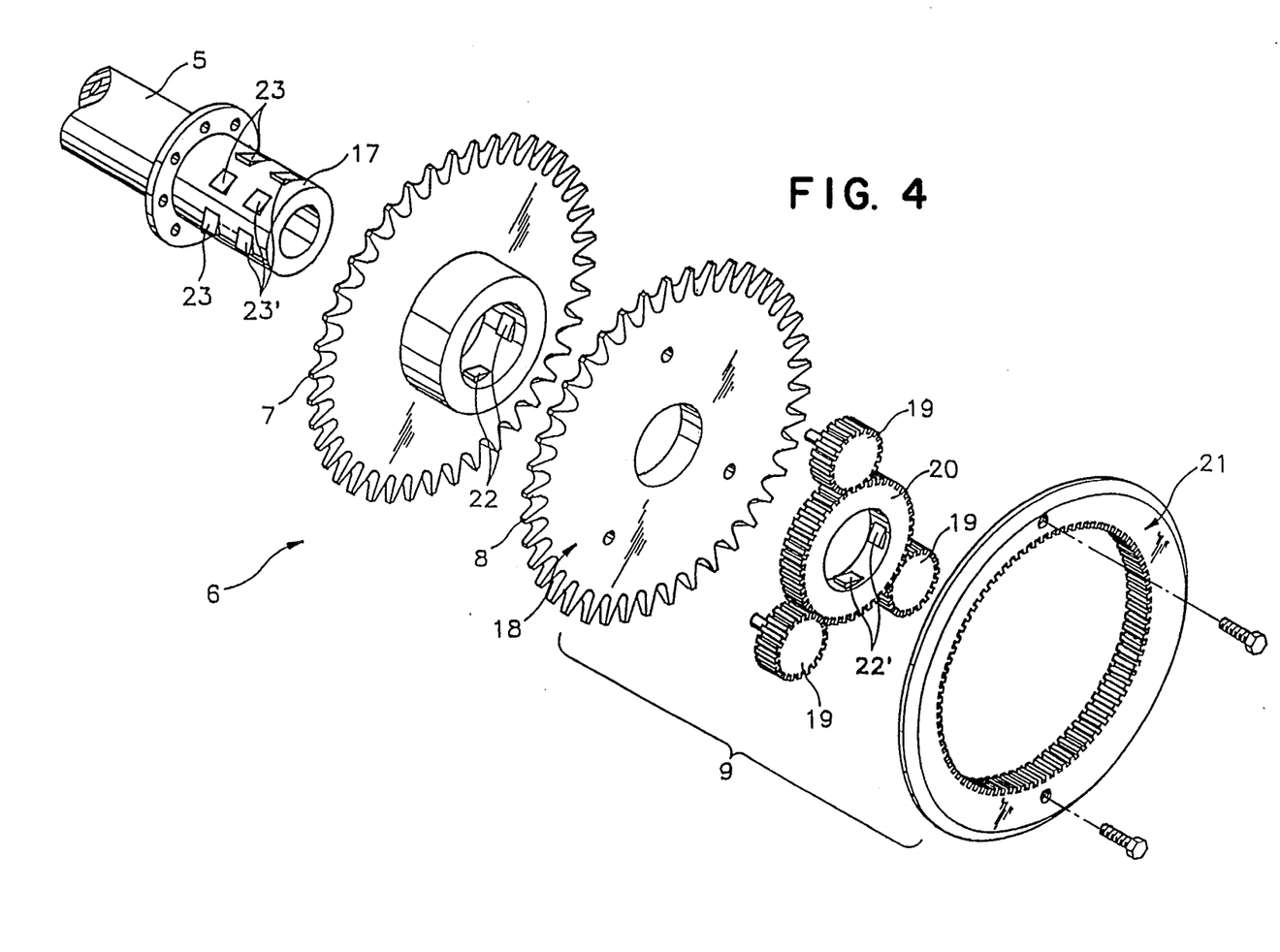
FIG. 4 is an exploded view of the rear transmission means shown in FIG. 2.

As shown in FIG. 4, rear planetary gear set 9 includes rear carrier 18 which forms fourth sprocket 8 on its outer perimeter and has second sun gear 20 adjacent to it. It also includes second planetary pinions 19 which are fixed on the rear carrier, being arranged on the perimeter of the second sun gear 20. Second ring gear 21 is then attached to rear tip 74 to encase planetary pinions 19.

Third sprocket 7 is constructed with sprocket teeth mounted on the perimeter of a solid wheel similar to the first sprocket. Therefore, any rotational force applied to the third sprocket in the forward direction will be maintained and transmitted to rear hub extension 17.

Although fourth sprocket 8 may be similar in diameter to third sprocket 7, the driving force transmitted to it is effectively decreased due to its internal gearing. This results in proportionate increases in rotational velocity for second sun gear 20 which drives hub extension 17. Hub 5 and rear wheel (not shown) are thereby driven at a faster rate than the fourth sprocket 8 due to their coupling with hub extension 17.

Because fourth sprocket 8 increases rotational velocity by decreasing rotational force, and third sprocket 7 transmits the rotational force and velocity applied to it without modification, both rotational force and velocity vary between third and fourth sprockets 7 and 8 as was the case with the first and second sprockets.

Therefore, rotational force and velocity variations are achievable in both the front and rear transmission means without variations in sprocket diameter.

Third sprocket 7 and second sun gear 20 are further comprised of ratchet means 22 and 22' located on their inner boundary. Projection means 23 and 23' are then coupled to hub extension 17 where third sprocket 7 and second sun gear 20 mount.

In a manner similar to that applied in the front transmission, the ratchet means 22 and 22' then brace against projection means 23 and 23' when the sprockets are rotating in the forward direction, and slide freely over the projection means when the sprockets are rotating in the reverse direction.

Therefore, the ratchet and projection means of the rear transmission means are used to maintain the rotational mobility in both the forward and reverse direction, while restricting the driving capability to the forward direction.

Another component in rear transmission means 6 is rear sprocket selector 54 which is coupled outside rear tips 74. It has guide gear 57 attached to its lower inside portion which is used to move chain 73 laterally across the rear sprockets. Because the rear sprockets may also be of equal diameter, chain 73 is able to maintain close proximity with all sprockets. Consequently, the chain experiences no vertical movement in the rear transmission means which results in a faster, more efficient shift as follows.

Guide gear 57 is shifted laterally when rear sprocket selector 54 is adjusted for a new sprocket. Because chain 73 is connected to and positioned by guide gear 57, lateral movements of the guide gear will cause lateral movements of the chain across the sprockets. Therefore, chain 73 is forced laterally toward the adjacent or receiving sprocket until a cog of this sprocket catches it. The chain is then completely transferred to the receiving sprocket after one full rotation has been completed.

The above-mentioned transmission assembly functions to transmit a forward rotational force applied to pedal 72 through crank shaft 70, front transmission means 4, chain 73, rear transmission means 6, and rear hub 5, finally to drive the rear wheel (not shown) in the forward direction.

The rotational velocity ratio is a measure of the amount of rotational velocity output at the rear wheel compared to the amount of rotational velocity at the crank shaft.

By adjusting the sprocket selectors, chain 73 may be connected to sprockets of varied internal gearing in both the front and rear transmission means. Therefore, the rotational velocity ratio may be modified by simply selecting various gear combinations.

Due to the difference in rotational velocity between the first and second sprockets 1 and 3 or between the third and fourth sprockets 7 and 8, the chain may derail during the shifting process. Ratchet means 15,16,22,24 on the front and rear transmission means serve to prevent this.

By transmitting the rotational force in only one direction, the ratchet means allows slipping of the slower sprocket in the forward direction. Therefore, this sprocket is able to achieve the same rotational velocity as the faster sprocket during the chain's transition between sprockets. Once the chain has completed this transition, the two sprockets are no longer connected by it, and they return to their respective rotational velocities.

When chain 73 is used to couple the first and third sprockets 1 and 7, any rotational force applied to pedal 72 will be preserved and directly transferred to rear hub 5 as previously discussed. Because of this, the rear wheel is driven with the same rotational force as applied to pedal 72. Therefore, coupling first and third sprockets 1 and 7 provides a velocity ratio of 1:1 which is well below the lowest available in conventional transmissions.

The first and fourth sprockets 1 and 8 are coupled when chain 73 is shifted by rear sprocket selector 54 to the fourth sprocket. Therefore, the effective rotational force from pedal 72 to the rear wheel is decreased due to rear planetary gear set 9. This results in an increased velocity ratio to 1:3.09 as described above.

The second and third sprockets 3 and 7 are coupled when chain 73 is shifted by front sprocket selector 53 to second sprocket 3. Therefore, the effective rotational force from pedal 72 to the rear wheel is further decreased due to front planetary gear set 2. This results in an increased velocity ratio to 1:1.41.

The second and fourth sprockets 3 and 8 are coupled when chain 73 is shifted by both front sprocket selector 53 and rear sprocket selector 54. Therefore, the effective rotational force from pedal 72 to the rear wheel is decreased due to front planetary gear set 2 and rear planetary gear set 9. This results in a velocity ratio of 1:4.36 which is well above the highest available in conventional transmissions.

The velocity ratios for the above sprocket combinations are determined by applying the formulas (1) and (2) below:

$$R_1(\omega + \Phi) = R_2(\psi - \omega)$$

$$R_3(\alpha - \omega) = R_2(\psi - \omega)$$

where $\alpha$ is the rotational angle of the ring gear, $R_1$ is the inner diameter of the sun gear, $\omega$ is the displacement angle of the planetary pinion center, $R_2$ is the inner diameter of the planetary pinion, $\psi$ is the rotational angle of the planetary pinion, $R_3$ is the inner diameter of the ring gear, and $\Phi$ is the rotational angle of the sun gear.

When all sprockets 1,3,7,8 are formed equivalent in diameter size and sprocket teeth number, both front planetary gear set 2 and ring gear 21 of rear planetary gear set 9 are stationary whereby Φ and α are each zero. Consequently, coupling first sprocket 1 with third sprocket 7 yields a 1:1 velocity ratio, second sprocket 3 with third sprocket 7 a 1:1.4 velocity ratio, first sprocket 1 with fourth sprocket 8 a 1:3.09 velocity ratio, and second sprocket 3 with fourth sprocket 8 a 1:4.36 velocity ratio.

As described above, according to the present invention, the transmission in the bicycle transmission assembly is realized by coupling front transmission means 4 with rear transmission means 6. Therefore, when each sprocket is of equal diameter, the assembly is simplified in its construction as the conventional multi-stage sprocket has been replaced with internally geared front and rear gear sets 2 and 9.

Although the transmission assembly described above contains two gears in the front and two in the rear, the assembly above may be used with one or more gears in either the front or rear transmission means. Therefore, while the preferred embodiments of the present invention have been illustrated and described, it is intended that the following appended claims be interpreted as including all such alterations and modifications as fall within the true scope and spirit of the present invention.

What is claimed is:

1. A transmission assembly for a bicycle comprising:
    front transmission means including:
        a first sprocket assembly having at least one sprocket for mounting on a crank shaft, the crank shaft being insertable in a seat tube wherein the at least one sprocket rotates with rotation of the crank shaft;
        at least one front planetary gear set defining multiple second sprockets positioned aside the first sprocket assembly, said front planetary gear sets rotating with rotation of the crank shaft;
    a front sprocket selector which is attached to the seat tube and is used for shifting chain from one sprocket to another sprocket in said first sprocket assembly and said front planetary gear sets;
    a flange formed at a side of the seat tube to provide additional guidance for the chain; and
    rear transmission means including:
        a second sprocket assembly having at least one second sprocket for mounting on a hub extension, wherein the at least one second sprocket rotates with rotation of the chain;
        at least one rear planetary gear set defining multiple third sprockets positioned aside the second sprocket assembly, said rear planetary gear sets rotate with rotation of the chain;
    a rear sprocket selector for shifting the chain from one sprocket to another sprocket in said second sprocket assembly and said rear planetary gear sets.

2. A transmission assembly for a bicycle as claimed in claim 1 wherein said front planetary gear sets comprise:
    a first sun gear positioned aside and attached to said flange;
    a plurality of first planetary pinions which are positioned along the outer perimeter of said first sun gear;
    a first ring gear for forming a second sprocket on its outer perimeter and for encircling said first sun gear and said first planetary pinions; and,
    a front carrier for connecting said first planetary pinions with the crank shaft.

3. A transmission assembly for a bicycle as claimed in claim 1 wherein said rear planetary gear sets comprise:
    a second sun gear rotatably coupled with the hub extension and positioned adjacent to the third sprocket assembly;
    a plurality of second planetary pinions which are positioned along the outer perimeter of said second sun gear; and,
    a rear carrier connected to said second planetary pinions and forming a fourth sprocket on its outer perimeter.

4. The transmission assembly of claim 2 wherein said front transmission means forms a ratchet means on the inner surface of both the first sprocket assembly and the front carrier for providing driving capability forward while allowing unobstructed rotation backward, and a projection means on the outer surface of the crank shaft for coupling said ratchet means.

5. A transmission assembly of claim 3 wherein said rear transmission means forms a ratchet means on the inner surface of both the second sprocket assembly and the second sun gear of its rear planetary gear sets for providing driving capability forward while allowing unobstructed rotation backward, and forms a projection means on the outer surface of the hub extension for coupling said ratchet means.

* * * * *